US012627623B2

(12) United States Patent
Connolly et al.

(10) Patent No.: US 12,627,623 B2
(45) Date of Patent: May 12, 2026

(54) SENDING GROUP MESSAGE TO TAGGED CONTACTS

(71) Applicant: Snap Inc., Santa Monica, CA (US)

(72) Inventors: Michael James Connolly, Mill Valley, CA (US); Daniel Vincent Grippi, New York, NY (US); Christie Marie Heikkinen, Sherman Oaks, CA (US); David Phillip Taitz, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 3 days.

(21) Appl. No.: 18/647,398

(22) Filed: Apr. 26, 2024

(65) Prior Publication Data

US 2025/0337704 A1 Oct. 30, 2025

(51) Int. Cl.
| | |
|---|---|
| *H04L 51/046* | (2022.01) |
| *G06Q 50/00* | (2024.01) |
| *H04L 51/10* | (2022.01) |
| *H04L 51/216* | (2022.01) |

(52) U.S. Cl.
CPC ........... *H04L 51/046* (2013.01); *G06Q 50/01* (2013.01); *H04L 51/10* (2013.01); *H04L 51/216* (2022.05)

(58) Field of Classification Search
USPC ................................................. 709/206, 232
See application file for complete search history.

(56) References Cited

U.S. PATENT DOCUMENTS

| | | | | |
|---|---|---|---|---|
| 9,681,099 | B1 * | 6/2017 | Deets, Jr. ............... | G06Q 10/10 |
| 12,316,610 | B1 * | 5/2025 | Muth .................... | H04L 63/102 |
| 12,321,566 | B2 * | 6/2025 | Leon ................... | H04M 1/7243 |
| 2012/0297313 | A1 * | 11/2012 | Sharma ................. | G06Q 10/10 |
| | | | | 715/751 |
| 2014/0258410 | A1 * | 9/2014 | Sittig .................... | G06Q 10/10 |
| | | | | 709/204 |
| 2015/0302098 | A1 * | 10/2015 | Hern ...................... | G06F 21/41 |
| | | | | 707/708 |
| 2018/0270177 | A1 * | 9/2018 | Liao ......................... | H04L 51/52 |
| 2020/0403951 | A1 * | 12/2020 | Kapoor ................. | H04L 51/216 |
| 2023/0370409 | A1 * | 11/2023 | Sivaswamy ............. | G06F 40/20 |

OTHER PUBLICATIONS

Aug. 11, 2023 Times of India, Instagram testing 'group tagging' feature: what is it, how it will work and more. (Year: 2023).*
Instagram Help Center, "What happens when someone mentions you in their Instagram story". retrieved May 28, 2025 (has multiple archived copies with prior art dates) (Year: 2025).*

(Continued)

*Primary Examiner* — Asad M Nawaz
(74) *Attorney, Agent, or Firm* — Schwegman Lundberg & Woessner, P.A.

(57) ABSTRACT

Aspects of the present disclosure involve a system comprising a storage medium storing a program and method for sending a group message to tagged contacts. The program and method provide for determining that a first user tagged at least two second users in association with a media content item created by the first user; and automatically adding, in response to the determining, a message to a group message thread between the first user and the at least two second users, wherein the message indicates that the at least two second users were tagged in association with the media content item.

18 Claims, 10 Drawing Sheets

(56)           References Cited

OTHER PUBLICATIONS

Youtube, theMuthership, "IG Story Group Chat", Feb. 8, 2024 URL: https://www.youtube.com/watch?v=vZ9UZvveQX4 (Year: 2024).*

Reddit, Monkey_Mason, "How do I stop Snachat from making a group when I tag people in my story?", original post on May 9, 2023 (Year: 2023).*

"Surprise!", [Online] Retrieved from the Internet: <URL: https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

* cited by examiner

400

DETERMINE THAT A FIRST USER TAGGED AT LEAST TWO SECOND USERS IN ASSOCIATION WITH A MEDIA CONTENT ITEM CREATED BY THE FIRST USER 802

AUTOMATICALLY ADD, IN RESPONSE TO THE DETERMINING, A MESSAGE TO A GROUP MESSAGE THREAD BETWEEN THE FIRST USER AND THE AT LEAST TWO SECOND USERS 804

SENDING GROUP MESSAGE TO TAGGED CONTACTS

BACKGROUND

Systems such as messaging systems provide for the exchange of message content between users. For example, such systems allow users to exchange message content (e.g., text, video, pictures) between each other.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Systems such as messaging systems provide for the exchange of message content between users. For example, such systems allow users to exchange message content (e.g., text, video, pictures) between each other.

The disclosed embodiments relate to a system that notifies users when they are tagged within a Story. In particular, the system determines when a first user tags two or more second users in association with a media content item for submitting as a Story. When first user selects to publish the Story, the system adds a message to a group thread message thread between the first user and the two or more second users. The message indicates that the two or more users were tagged in the Story, and includes a link to the Story which includes the media content item.

In some cases, the first user may tag a combination of bidirectional contacts (e.g., a "friend" who the first user has added as a contact, and who the contact has also added back) and non-bidirectional contacts (e.g., who is either added as a contact by the first user, or who added the first user as a contact, but not both). In such cases, the system sends a message to the group message thread including the first user and the bidirectional contacts, and separately sends individual messages to each non-bidirectional contact.

By virtue of the foregoing, the system provides for increased user engagement with respect to generating and/or sharing media content items. For example, the system facilitates group messaging and/or individual messaging in association with publishing Stories. By automatically updating messages threads in this manner, the system saves time for end users (e.g., posters of Stories), and reduces computational resources/processing power.

Networked Computing Environment

Figure 1:
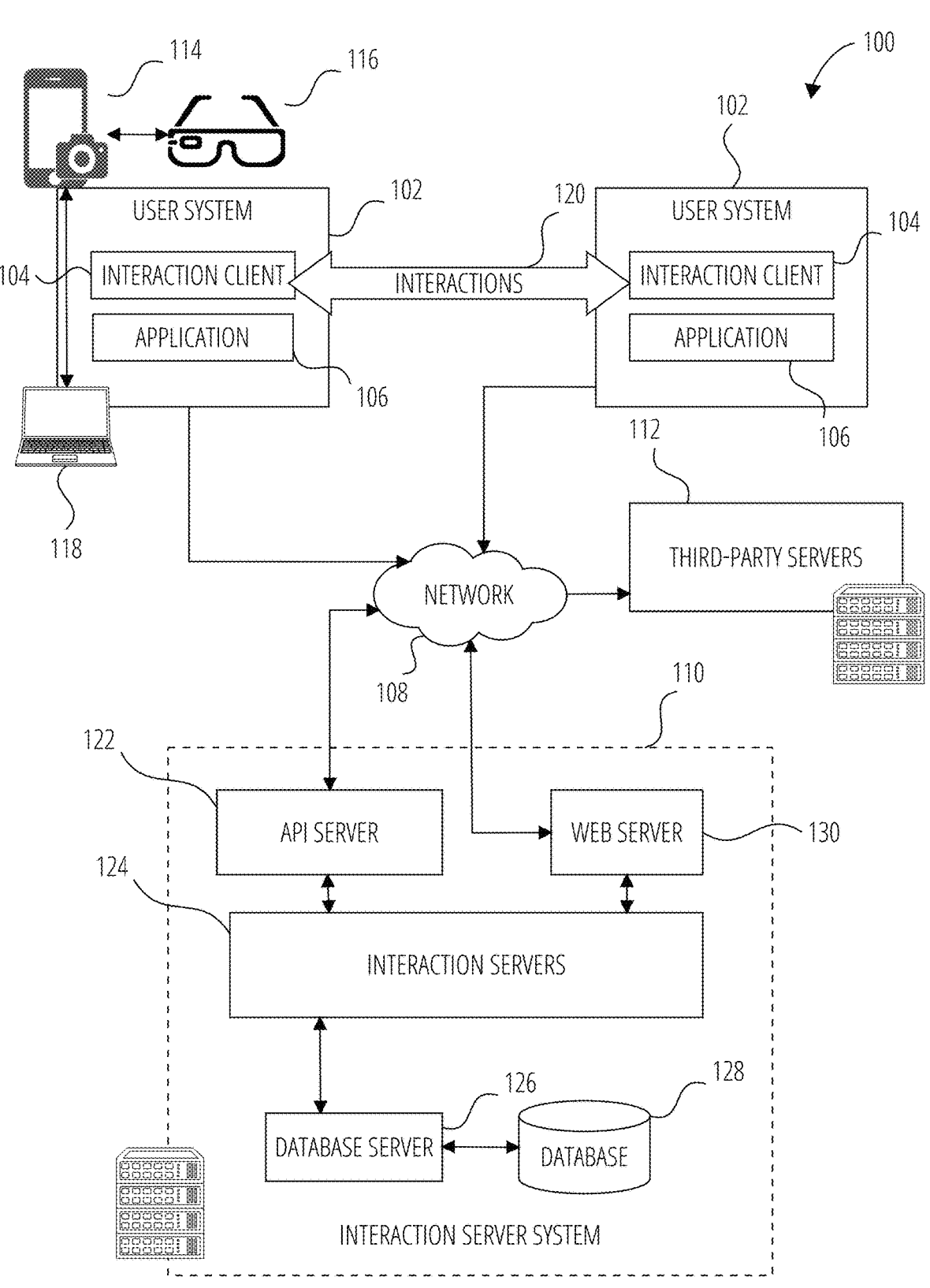
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a Story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

System Architecture

Figure 2:
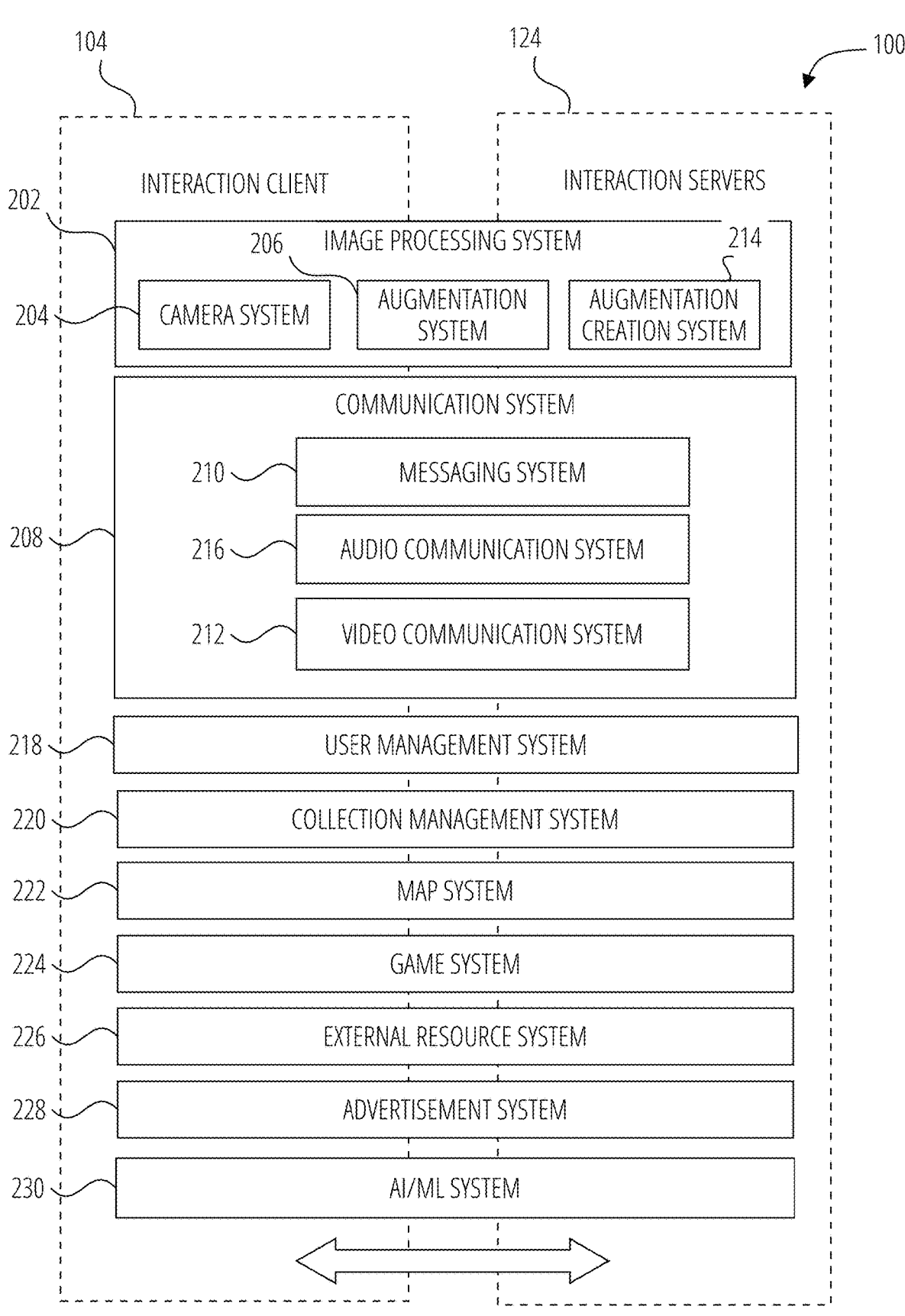
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geo-location of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a Story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource.

In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
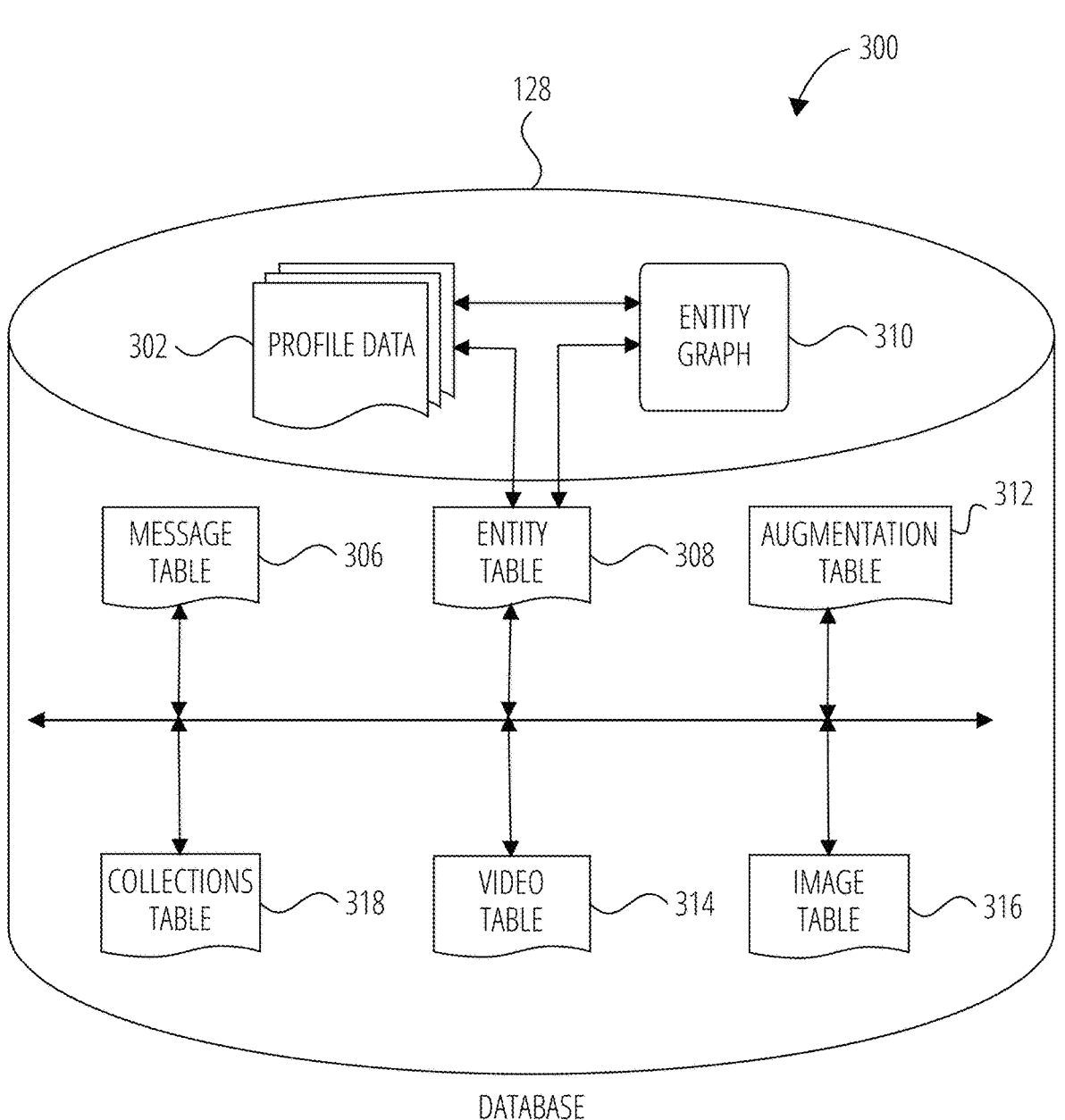
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a Story or a gallery). The creation of a particular collection may be initiated by a particular user (e.g., each user for which a record is maintained in the entity table 308). A user may create a "personal Story" in the form of a collection of content that has been created and sent/broadcast by that user. To this end, the user interface of the interaction client 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a curated stream of user-submitted content from various locations and events. Users whose client devices have location services enabled and are at a common location event at a particular time may, for example, be presented with an option, via a user interface of the interaction client 104, to contribute content to a particular live Story. The live Story may be identified to the user by the interaction client 104, based on his or her location. The end result is a "live Story" told from a community perspective.

A further type of content collection is known as a "location Story," which enables a user whose user system 102 is located within a specific geographic location (e.g., on a college or university campus) to contribute to a particular collection. In some examples, a contribution to a location Story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Data Communications Architecture

Figure 4:
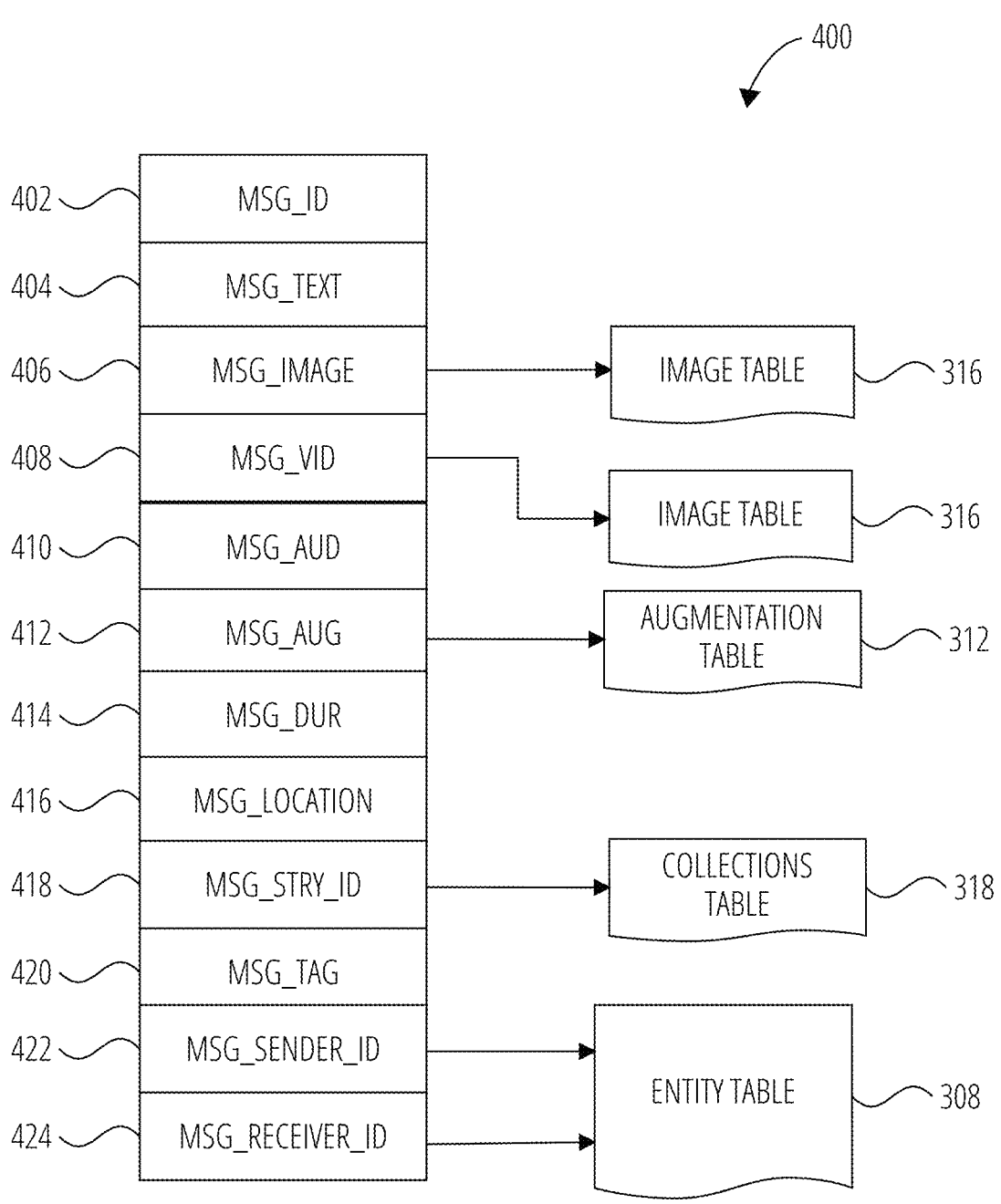
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "Stories" identified in the collections table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Figure 5:
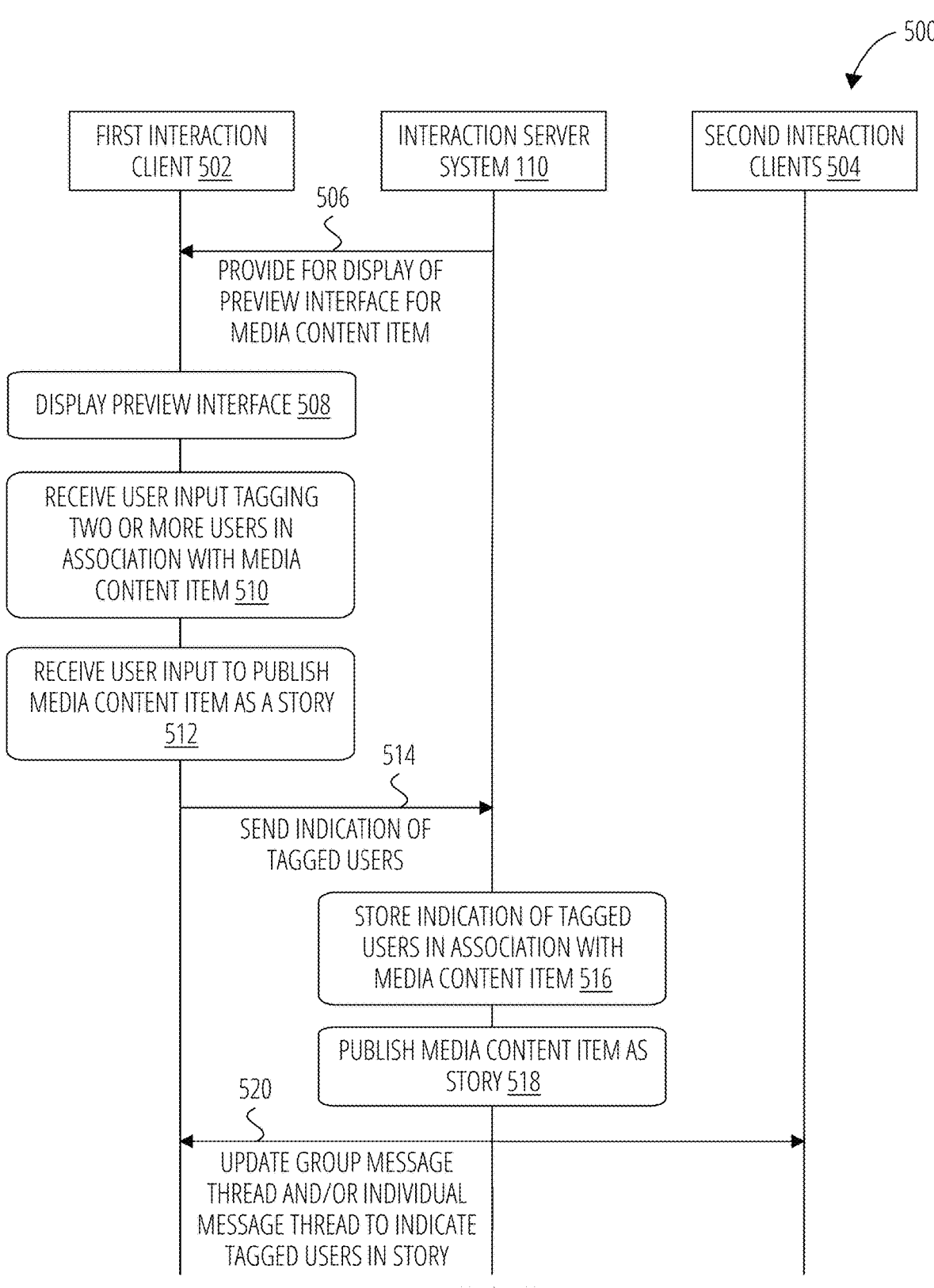
FIG. 5 is an interaction diagram illustrating a process for sending a group message to tagged contacts, in accordance with some examples.

FIG. 5 is an interaction diagram illustrating a process 500 for sending a group message to tagged contacts, in accordance with some examples. For explanatory purposes, the process 500 is primarily described herein with reference to the interaction client 104 (e.g., corresponding to a first interaction client 502 and second interaction clients 504) and to the interaction server system 110 of FIG. 1. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

In example embodiments, each of the first interaction client 502 and the second interaction clients 504 correspond to respective instances of the interaction client 104, with the first interaction client 502 running on a first device (e.g., a first user system 102) and the second interaction clients 504 running on respective second devices (e.g., user systems 102). The first interaction client 502 is associated with a respective first user, and the second interaction clients 504 are associated with respective second users of the interaction system 100. For example, the first user is associated with a respective first user account of the interaction server system 110, and the second users are associated with respective second user accounts of the interaction server system 110. As noted above, the first user and the second users are identified by the interaction server system 110 based on unique identifiers (e.g., a messaging system identifier, email address and/or a device identifier) associated with the respective user accounts for the first user and the second users.

As described herein, the interaction system 100 provides for notifying users when they are tagged within a Story. In particular, the interaction system 100 determines when the first user tags the second users in association with a media content item for including in a Story. In response to determining that at least two second users are tagged and when the first user selects to publish the Story, the interaction system 100 automatically adds a message to a group thread message thread between the first user and the second users.

As shown in FIG. 5, the interaction server system 110 provides for the first interaction client 502 to display a preview interface for a media content item (operation 506), and the first interaction client 502 displays the preview interface (block 508).

In example embodiments, the preview interface provides for previewing and/or sending a media content item created by the first user. For example, the media content item may have been created via a camera interface displayed by the interaction client 104. The camera interface provides for the first user to capture a video or photo (e.g., via a front or rear facing camera) in real-time and to optionally apply augmented reality content thereto. The captured video or photo, with augmented reality content if applicable, corresponds to the media content item presented within the preview interface.

In another example, the media content item corresponds to a previously-captured photo or video selected from a photo library (e.g., stored locally on the first interaction client 502 or stored remotely in association with the account of the first user on the interaction system 100). The selected video or photo, with any applied augmented reality content, corresponds to the media content item presented within the preview interface.

In example embodiments, the preview interface includes one or more user-selectable elements (e.g., buttons) for: modifying/annotating (e.g., drawing on, adding text to, adding stickers to, cropping, and the like) the media content item; saving the media content item; publishing a Story based on the media content item; and/or sending a message including the media content item.

At block 510, the first interaction client 502 receives user input tagging two or more users in association with the media content item. In example embodiments, the preview interface includes a sticker interface for adding a sticker to a media content item. The sticker interface includes a user-selectable element for tagging (or "mentioning") contacts in association with the media content item. For example, the user-selectable element is depicted as an "@" icon which is selectable to surface a selection interface for selecting one or more contacts of the first user, to tag in association with the media content item.

In example embodiments, the selection interface provides for the first user to select one or more of: individual contacts of the first user; group contacts (e.g., predefined groups of contacts of the first user, such as family members, work friends, or the like); and/or dynamically created groups (e.g., "nearby" contacts of the user who are within a predefined distance of the first user, or other groups that are dynamically generated with respect to the location and/or status of the first user).

Thus, in the example of FIG. 5, the first user tags, via sticker interface and the selection interface, two or more users in association with the media content item. In example embodiments, each of the names of the two or more users is presented as a sticker overlaid on the media content item (e.g., in the format of @[tagged contact name]). In a case where particular user(s) were selected via a group contact and/or a dynamically-created group, the individual names of those users are presented as respective stickers overlaid on the media content item (e.g., instead of presenting the group contact name as an overlay).

At block 512, the first interaction client 502 receives user input to publish the media content item as a Story. In example embodiments, the preview interface includes both a first user-selectable element and a second user-selectable element, each of which is selectable to add a media content item as a Story to a user's content feed.

For example, the first user-selectable element is a quick post button (e.g., a "+Stories" button). In response to user selection of this button, the first interaction client 502 provides for user selection to post/add the media content item to one or more of: a "friends only" Story (e.g., which is only viewable by friends of the user); a public Story (e.g., which is viewable by all users of the interaction system 100); a location Story (e.g., which limits contributors to those located within a specific geographic location); a private Story (e.g., to which only the user can add, and which allows the user to decide which friends can view the Story); and/or a custom Story (e.g., which allows users to create their own group Story and specify exactly who gets to see and contribute, and in what area they can do so).

On the other hand, the second user-selectable element is a send button (e.g., a "send to" button). In response to user selection of this button, the first interaction client 502 provides for the user to publish the media content item as a Story (e.g., as a friends only Story, public Story, location Story, private Story, custom Story, and the like), or to send the media content item to one or more contacts of the first user. Thus, in the example of FIG. 5, the first user selects, via the first user-selectable element (e.g., the quick post button) or via the first user-selectable element (e.g., the send to button), to publish the media content item as a Story.

The first interaction client 502 sends an indication of the tagged users to the interaction server system 110 (operation 514), and the interaction server system 110 stores an indication of the tagged users in association with the media content item (block 516). For example, the interaction server system 110 provides for storing the indication of the tagged users, in association with the media content item, within the collections table 318 of the database 128.

At block 518, the interaction server system 110 publishes the media content item as, or as part of, the Story for the first user. As noted above, the Story may correspond to a friend's only Story, a public Story, a location Story, a private Story, and/or a custom Story.

In response to user selection to publish the media content item as a Story, the interaction server system 110 updates a group message thread and/or an individual message thread to indicate the tagged users (operation 520). In example embodiments, the group message thread is presented in a message thread interface.

The message thread interface presents message content (e.g., messages, image, video and/or audio) exchanged between the users within the group. In example embodiments, the message thread interface includes a message input box for adding content to the message thread. For example, a user within the group message thread user may input text into the message input box using a virtual keyboard, which may include a button (e.g., a "send" button) for submitting the user-inputted text to the message thread.

In example embodiments, the interaction server system 110 is configured to determine whether the tagged users are bidirectional contacts or non-bidirectional contacts. As described herein, a bidirectional contact is one who has added another as a contact, and who the other contact has added (e.g., friend). For example, with respect to the first user, a bidirectional contact is a contact (e.g., friend) who the first user has added as a contact, and who the contact has also added back. On the other hand, a non-bidirectional contact is either added by the first user, or added the first user, but not both.

In a case where the first user tagged two or more bidirectional contacts, the interaction server system 110 is configured to provide a message to a group message thread that includes the first user and the tagged two or more bidirectional contacts. If the group message thread already exists, the interaction server system 110 adds the message (e.g., as a new message) to the existing message thread for that group. Otherwise, the interaction server system 110 creates a new message thread for the group, and adds the message as the first message to the created message thread for the group.

In a case where the first user tagged non-bidirectional contact(s), the interaction server system 110 is configured to provide a message to an individual message thread between the first user and each tagged non-bidirectional contact. If the individual message thread already exists, the interaction server system 110 adds the message (e.g., as a new message) to the existing message thread. Otherwise, the interaction server system 110 creates a new individual message thread, and adds the message as the first message to the created individual message thread.

As noted above, if there are at least two tagged bidirectional contacts, the interaction server system 110 provides a message to a group message thread between the first user and the tagged bidirectional contacts. However, if there is only one tagged bidirectional contact, the interaction server system 110 provides the message as an individual message. Moreover, the interaction server system 110 provides a separate individual message to each tagged non-bidirectional contact. Thus, the interaction server system 110 may send a combination of a group message and one or more individual messages.

As discussed further below with respect to FIG. 6, prior to automatically updating the group message thread, the first interaction client 502 may present a dialog (e.g., an overlay) prompting the first user to confirm updating the group message thread, or to cancel. If the first user cancels, the first interaction client 502 reverts to the preview interface, where the user can further modify the media content item (e.g., to modify the list of tagged users associated with the media content item). If the first user confirms, the first interaction client 502 continues to a "send to" screen, from which the first user can have the message sent to the group message thread. In example embodiments, the dialog is only presented on the first interaction client 502 on the first eligible media content item (e.g., where "eligible" corresponds to at least two tagged bidirectional contacts, with the first user selecting to publish as a Story).

With respect to the content of the message, the message includes a link to the Story (e.g., as a friends only Story, public Story, location Story, private Story, custom Story, and the like) corresponding to the media content item. The link is selectable to view the Story. Moreover, the message includes a status for the Story. Thus, the message thread is updated to include both the link to the Story and the status for the Story (e.g., as discussed further below with respect to FIG. 7).

In example embodiments, for a group message, the status presented to the Story poster (e.g., the first user) is "You mentioned [X] people in your Story." For those users who were tagged/mentioned in the Story, the status to them indicates "[Poster] mentioned you and [other friend] in their Story" (e.g., if only two bidirectional users were tagged) or "[Poster] mentioned you and [X] others in their Story" (e.g., if three or more bidirectional users were tagged).

For an individual message, the status presented to the Story poster (e.g., the first user) is "You mentioned [friend] in your Story." For each tagged non-bidirectional user, the status to them indicates "[Poster] mentioned you and in their Story."

By virtue of the foregoing, the interaction system 100 provides for increased user engagement with respect to generating and/or sharing media content items. For example, the interaction system 100 facilitates updating group message threads and/or individual message in association with publishing media content items. By automatically updating messages threads in this manner, the interaction system 100 saves time for end users, and reduces computational resources/processing power.

Figure 6:
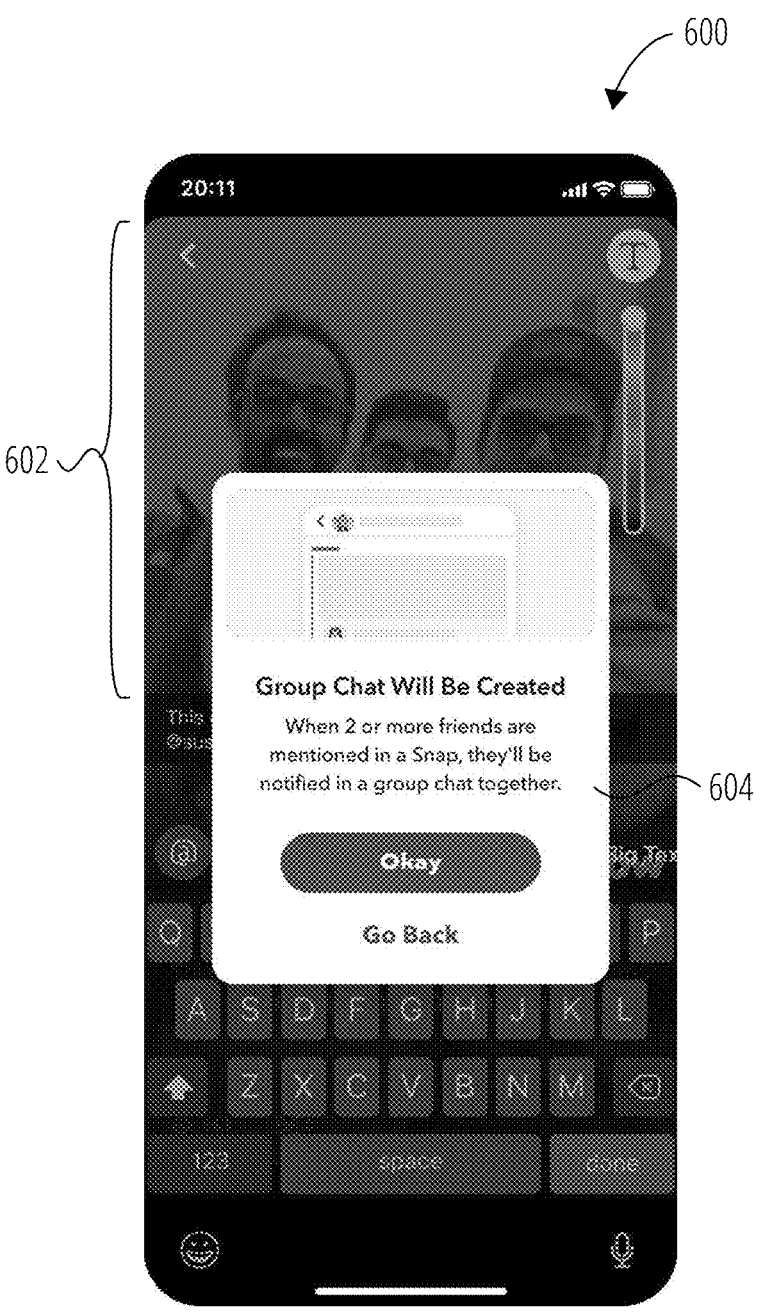
FIG. 6 illustrates a user interface prompting a user to confirm sending a group message to tagged contacts, in accordance with some examples.

FIG. 6 illustrates a user interface 600 prompting a user to confirm sending a group message to tagged contacts, in accordance with some examples. The dialog 604 is provided, for example, as an overlay within a user interface 600.

While not shown in the example of FIG. 6, the user interface 600 may include a sticker interface for tagging/mentioning (e.g., using an "@" icon) users in association with a media content item 602. In addition, the user interface 600 may include user-selectable elements (e.g., a "+Stories" button and/or a "send to" button) for publishing the media content item 602 as a Story.

As noted above, the interaction client 104 presents the dialog 604 as an overlay on the user interface 600, for the first eligible media content item (e.g., with at least two tagged bidirectional contacts to publish as a Story), and not for subsequently eligible media content items. The dialog 604 provides for the first user to either confirm updating the group message thread (e.g., the "Okay" button), or to cancel (e.g., the "Go Back" button). If the first user cancels, the first interaction client 502 reverts to the preview interface, where the user can further view or modify the media content item (e.g., to modify the list of tagged users associated with the media content item).

If the first user confirms, the first interaction client 502 displays an interface from which the first user selects how the Story is published (e.g., as a friends only Story, public Story, location Story, private Story, custom Story, and the like). The Story is published based on the user selection, and a group message thread and/or individual message thread(s) are updated with a message to indicate the tagged contacts. An example of updating a group message thread with the message is described below with respect to FIG. 7.

Figure 7:
FIG. 7 illustrates a group message interface which is updated with a message indicating that at least two users were tagged in a Story, according to some examples.

FIG. 7 illustrates a group message interface 700 which is updated with a message 708 indicating that at least two users were tagged in a Story, according to some examples. As shown in the example of FIG. 7, the group message interface 700 includes an avatars icon 702, a group members list 704, a group message thread 706, the message 708 (with a status 710 and a link 712), and a message input interface 714.

As noted above with respect to FIG. 6, if the first user tagged the media content item with at least two tagged bidirectional contacts, the interaction server system 110 adds the message 708 to group message thread 706 between the first user and the tagged bidirectional contacts. While not shown in FIG. 7, if the first user also tagged non-bidirectional contact(s), the interaction server system 110 would provide a respective message to an individual message thread between the first user and the tagged non-directional contact(s).

In the example of FIG. 7, the avatars icon 702 depicts avatars of the tagged bidirectional contacts. Moreover, the group members list 704 lists the individual names of the tagged bidirectional contacts. The group members list 704 is user-selectable to expand the list of group members in a case where the entirety of the group members list 704 is not displayable (e.g., does not fit) within the group message interface 700. In example embodiments, if the first user tagged the bidirectional contacts using a group contact (e.g., a predefined group of contacts of the first user), the group members list 704 may display the group contact (e.g., "work friends") name instead of the individual names of the tagged bidirectional contacts.

In the example of FIG. 7, the group message interface 700 is from the perspective of a tagged bidirectional contact of the first user. As noted above with respect to FIG. 5, the message 708 includes a status 710 with the format of "[Poster] mentioned you and [X] others in their Story" (e.g., since three or more bidirectional users were tagged). Thus, the status 710 in FIG. 7 indicates "Christie mentioned you and 3 others in their Story."

Moreover, the message 708 includes a link 712 to the Story (e.g., a friends only Story, public Story, location Story, private Story, or custom Story). The link 712 is selectable to view the Story. In the example of FIG. 7, the link 712 is depicted as an image (e.g., the image of the media content item in case where the media content item is a photo, or a representative frame of the media content item in a case where the media content item is a video).

In response to addition of the message 708 to the group message thread 706 by the interaction client 104, any of the users within the group members list 704 may add content to the group message thread 706. In this regard, the group message interface 700 includes a message input box for adding content to the group message thread 706. For example, a user within the group members list 704 may input text into the message input box of the message input interface 714 using the virtual keyboard of the message input interface 714. Moreover, the message input interface 714 includes a button (e.g., a "send" button) for submitting the user-inputted text to the group message thread 706.

Figure 8:
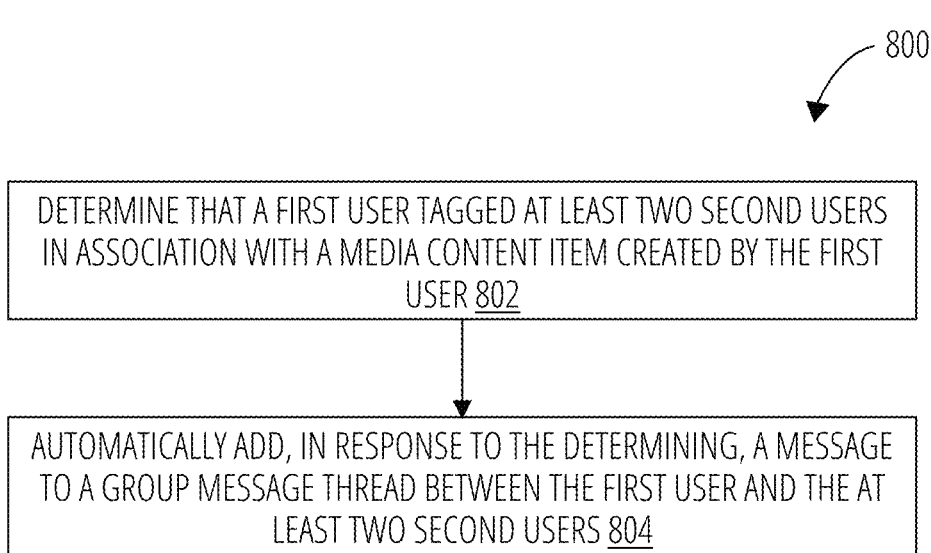
FIG. 8 is a flowchart illustrating a process for sending a group message to tagged contacts, in accordance with some examples.

FIG. 8 is a flowchart illustrating a process 800 for sending a group message to tagged contacts, in accordance with some examples. For explanatory purposes, the process 800 is primarily described herein with reference to the interaction server system 110, the first interaction client 502 and the second interaction clients 504 of FIGS. 1 and 5. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

The interaction server system 110 determines that a first user of the first interaction client 502 tagged at least two second users of the second interaction clients 504 in association with a media content item created by the first user (block 802). In example embodiments, the interaction server system 110 causes, on the first interaction client 502, display of an interface element for tagging the at least two second users in association with the media content item.

The interaction server system 110 receives an indication of user input provided by the first user via the interface element, the user input selecting the at least two second users for tagging in association with the media content item. Determining that the first user tagged the at least two second users corresponds to receiving the indication. In example embodiments, the user input selecting the at least two second users corresponds to user selection of a predefined group which includes the first user and the at least two second users.

The interaction server system 110 automatically adds, in response to the determining, a message to a group message thread between the first user and the at least two second users (block 804). The message indicates that the at least two second users were tagged in association with the media content item.

In example embodiments, the interaction server system 110 receives an indication of user input to publish the media content item as a Story associated with the first user. Automatically adding the message to the group message thread is further in response to receiving the indication. The interaction server system 110 may prompt the first user prior to adding the message to the group message thread.

In example embodiments, the interaction server system 110 identifies a non-bidirectional contact within the at least two second users, refrains from adding the non-directional contact to the group message thread, and instead adds a second message to an individual message thread between the first user and the non-bidirectional contact. The second message indicates that the non-bidirectional contact was tagged in association with the media content item.

In example embodiments, the interaction server system 110 detects, prior to adding the message to the group message thread, that the group message thread exists between the first user and the at least two second users. Adding the message to the group message thread is performed based on the detecting.

Alternatively, the interaction server system 110 detects, prior to adding the message to the group message thread, that the group message thread does not exist between the first user and the at least two second users, and creates, based on the detecting, the group message thread between the first user and the at least two second users. Adding the message to the group message thread is performed based on the creating.

Machine Architecture

Figure 9:
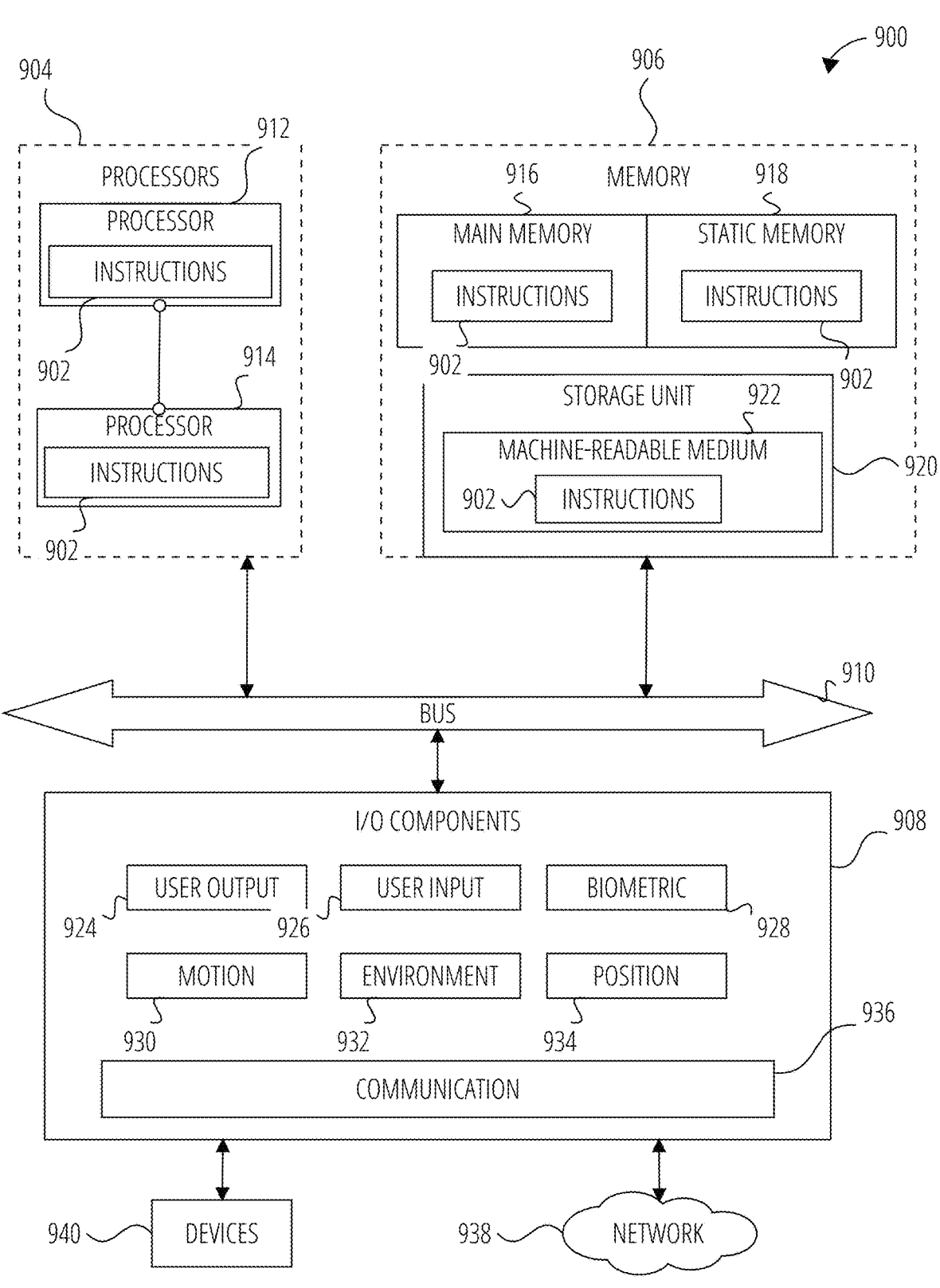
FIG. 9 is a diagrammatic representation of a machine in the form of a computer system within which a set of instructions may be executed to cause the machine to perform any one or more of the methodologies discussed herein, according to some examples.

FIG. 9 is a diagrammatic representation of the machine 900 within which instructions 902 (e.g., software, a program, an application, an applet, an app, or other executable code) for causing the machine 900 to perform any one or more of the methodologies discussed herein may be executed. For example, the instructions 902 may cause the machine 900 to execute any one or more of the methods described herein. The instructions 902 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while a single machine 900 is illustrated, the term "machine" shall also be taken to include a collection of machines that individually or jointly execute the instructions 902 to perform any one or more of the methodologies discussed herein. The machine 900, for example, may comprise the user system 102 or any one of multiple server devices forming part of the interaction server system 110. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 908, which may be configured to communicate with each other via a bus 910. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that execute the instructions 902. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 916, a static memory 918, and a storage unit 920, both accessible to the processors 904 via the bus 910. The main memory 906, the static memory 918, and storage unit 920 store the instructions 902 embodying any one or more of the methodologies or functions described herein. The instructions 902 may also reside, completely or partially, within the main memory 916, within the static memory 918, within machine-readable medium 922 within the storage unit 920, within at least one of the processors 904 (e.g., within the processor's cache memory), or any suitable combination thereof, during execution thereof by the machine 900.

The I/O components 908 may include a wide variety of components to receive input, provide output, produce output, transmit information, exchange information, capture measurements, and so on. The specific I/O components 908 that are included in a particular machine will depend on the type of machine. For example, portable machines such as mobile phones may include a touch input device or other such input mechanisms, while a headless server machine will likely not include such a touch input device. It will be appreciated that the I/O components 908 may include many other components that are not shown in FIG. 9. In various examples, the I/O components 908 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 908 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 3600 camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 908 further include communication components 936 operable to couple the machine 900 to a network 938 or devices 940 via respective coupling or connections. For example, the communication components 936 may include a network interface component or another suitable device to interface with the network 938. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 940 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 916, static memory 918, and memory of the processors 904) and storage unit 920 may store one or more sets of instructions and data structures (e.g., software) embodying or used by any one or more of the methodologies or functions described herein. These instructions (e.g., the instructions 902), when executed by processors 904, cause various operations to implement the disclosed examples.

The instructions 902 may be transmitted or received over the network 938, using a transmission medium, via a network interface device (e.g., a network interface component included in the communication components 936) and using any one of several well-known transfer protocols (e.g., hypertext transfer protocol (HTTP)). Similarly, the instructions 902 may be transmitted or received using a transmission medium via a coupling (e.g., a peer-to-peer coupling) to the devices 940.

Software Architecture

Figure 10:
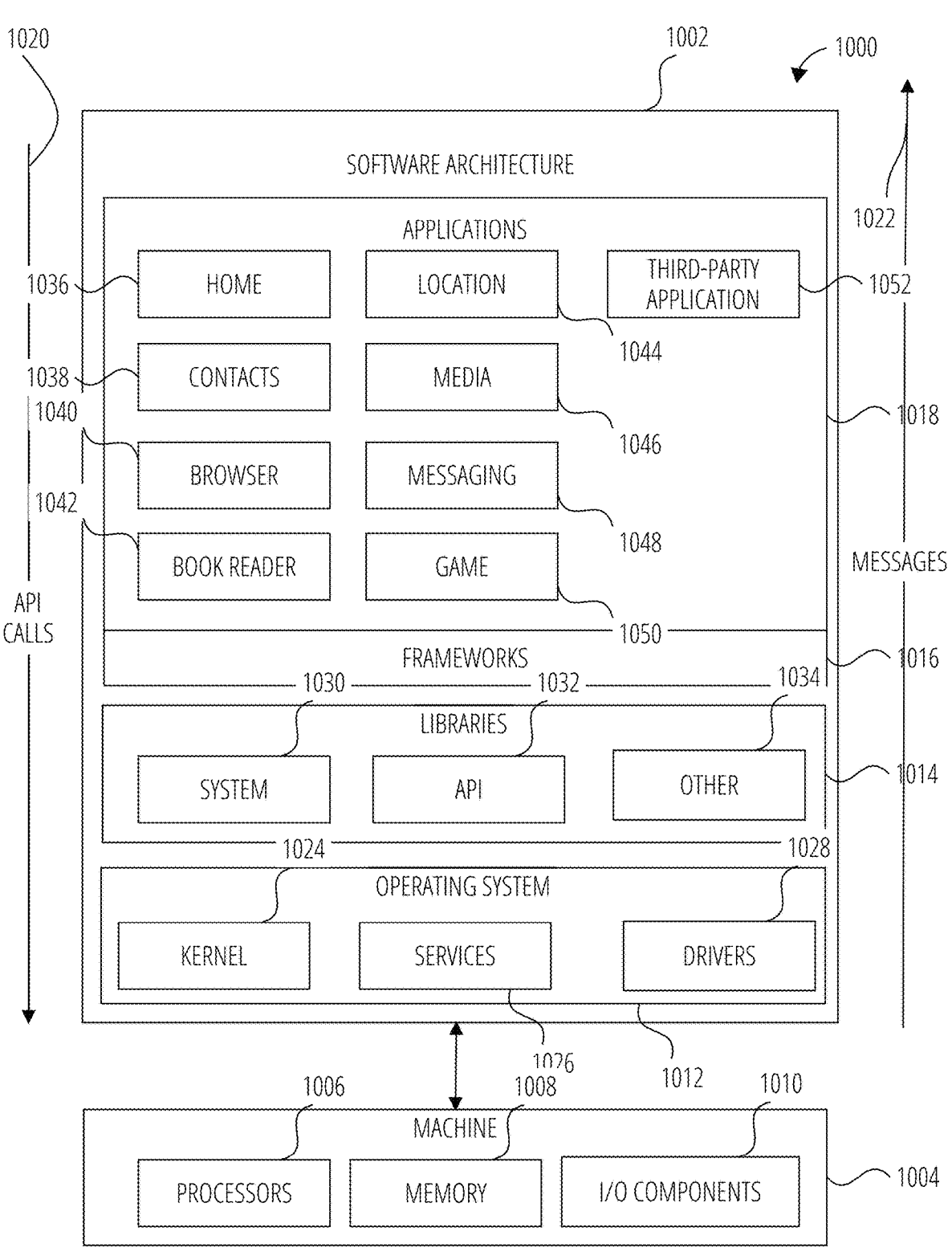
FIG. 10 is a block diagram showing a software architecture within which examples may be implemented.

FIG. 10 is a block diagram 1000 illustrating a software architecture 1002, which can be installed on any one or more of the devices described herein. The software architecture 1002 is supported by hardware such as a machine 1004 that includes processors 1006, memory 1008, and I/O components 1010. In this example, the software architecture 1002 can be conceptualized as a stack of layers, where each layer provides a particular functionality. The software architecture 1002 includes layers such as an operating system 1012, libraries 1014, frameworks 1016, and applications 1018. Operationally, the applications 1018 invoke API calls 1020 through the software stack and receive messages 1022 in response to the API calls 1020.

The operating system 1012 manages hardware resources and provides common services. The operating system 1012 includes, for example, a kernel 1024, services 1026, and drivers 1028. The kernel 1024 acts as an abstraction layer between the hardware and the other software layers. For example, the kernel 1024 provides memory management, processor management (e.g., scheduling), component management, networking, and security settings, among other functionalities. The services 1026 can provide other common services for the other software layers. The drivers 1028 are responsible for controlling or interfacing with the underlying hardware. For instance, the drivers 1028 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1014 provide a common low-level infrastructure used by the applications 1018. The libraries 1014 can include system libraries 1030 (e.g., C standard library) that provide functions such as memory allocation functions, string manipulation functions, mathematic functions, and the like. In addition, the libraries 1014 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1014 can also include a wide variety of other libraries 1034 to provide many other APIs to the applications 1018.

The frameworks 1016 provide a common high-level infrastructure that is used by the applications 1018. For example, the frameworks 1016 provide various graphical user interface (GUI) functions, high-level resource management, and high-level location services. The frameworks 1016 can provide a broad spectrum of other APIs that can be used by the applications 1018, some of which may be specific to a particular operating system or platform.

In an example, the applications 1018 may include a home application 1036, a contacts application 1038, a browser application 1040, a book reader application 1042, a location application 1044, a media application 1046, a messaging application 1048, a game application 1050, and a broad assortment of other applications such as a third-party application 1052. The applications 1018 are programs that execute functions defined in the programs. Various programming languages can be employed to create one or more of the applications 1018, structured in a variety of manners, such as object-oriented programming languages (e.g., Objective-C, Java, or C++) or procedural programming languages (e.g., C or assembly language). In a specific example, the third-party application 1052 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1052 can invoke the API calls 1020 provided by the operating system 1012 to facilitate functionalities described herein.

EXAMPLES

Example 1 is a system comprising: at least one processor; at least one memory component storing instructions that, when executed by the at least one processor, cause the at least one processor to perform operations comprising: determining that a first user tagged at least two second users in association with a media content item created by the first user; and automatically adding, in response to the determining, a message to a group message thread between the first user and the at least two second users, wherein the message indicates that the at least two second users were tagged in association with the media content item.

In Example 2, the subject matter of Example 1 includes, the operations further comprising: receiving an indication of user input to publish the media content item as a Story associated with the first user, wherein automatically adding the message to the group message thread is further in response to receiving the indication.

In Example 3, the subject matter of Examples 1-2 includes, the operations further comprising: causing, on a first device associated with the first user, display of an interface element for tagging the at least two second users in association with the media content item; and receiving an indication of user input provided by the first user via the interface element, the user input selecting the at least two second users for tagging in association with the media content item, wherein the determining corresponds to receiving the indication.

In Example 4, the subject matter of Example 3 includes, wherein the user input selecting the at least two second users corresponds to user selection of a predefined group which includes the first user and the at least two second users.

In Example 5, the subject matter of Examples 3-4 includes, the operations further comprising: causing, on the first device and on at least two second devices associated with the at least two second users, display of the message on the group message thread.

In Example 6, the subject matter of Examples 1-5 includes, the operations further comprising: prompting the first user prior to adding the message to the group message thread.

In Example 7, the subject matter of Examples 1-6 includes, the operations further comprising: identifying a non-bidirectional contact within the at least two second users; and refraining from adding the non-directional contact to the group message thread; and adding a second message to an individual message thread between the first user and the non-bidirectional contact, wherein the second message indicates that the non-bidirectional contact was tagged in association with the media content item.

In Example 8, the subject matter of Examples 1-7 includes, the operations further comprising: detecting, prior to adding the message to the group message thread, that the group message thread exists between the first user and the at least two second users, wherein adding the message to the group message thread is performed based on the detecting.

In Example 9, the subject matter of Examples 1-8 includes, the operations further comprising: detecting, prior to adding the message to the group message thread, that the group message thread does not exist between the first user and the at least two second users; and creating, based on the detecting, the group message thread between the first user and the at least two second users, wherein adding the message to the group message thread is performed based on the creating.

Example 10 is a method comprising: determining that a first user tagged at least two second users in association with a media content item created by the first user; and automatically adding, in response to the determining, a message to a group message thread between the first user and the at least two second users, wherein the message indicates that the at least two second users were tagged in association with the media content item.

In Example 11, the subject matter of Example 10 includes, receiving an indication of user input to publish the media content item as a Story associated with the first user, wherein automatically adding the message to the group message thread is further in response to receiving the indication.

In Example 12, the subject matter of Examples 10-11 includes, causing, on a first device associated with the first user, display of an interface element for tagging the at least two second users in association with the media content item; and receiving an indication of user input provided by the first user via the interface element, the user input selecting the at least two second users for tagging in association with the media content item, wherein the determining corresponds to receiving the indication.

In Example 13, the subject matter of Example 12 includes, wherein the user input selecting the at least two second users corresponds to user selection of a predefined group which includes the first user and the at least two second users.

In Example 14, the subject matter of Examples 12-13 includes, causing, on the first device and on at least two second devices associated with the at least two second users, display of the message on the group message thread.

In Example 15, the subject matter of Examples 10-14 includes, prompting the first user prior to adding the message to the group message thread.

In Example 16, the subject matter of Examples 10-15 includes, identifying a non-bidirectional contact within the at least two second users; and refraining from adding the non-directional contact to the group message thread; and adding a second message to an individual message thread between the first user and the non-bidirectional contact, wherein the second message indicates that the non-bidirectional contact was tagged in association with the media content item.

In Example 17, the subject matter of Examples 10-16 includes, detecting, prior to adding the message to the group message thread, that the group message thread exists between the first user and the at least two second users, wherein adding the message to the group message thread is performed based on the detecting.

In Example 18, the subject matter of Examples 10-17 includes, detecting, prior to adding the message to the group message thread, that the group message thread does not exist between the first user and the at least two second users; and creating, based on the detecting, the group message thread between the first user and the at least two second users, wherein adding the message to the group message thread is performed based on the creating.

Example 19 is a non-transitory computer-readable storage medium storing instructions that, when executed by at least one processor, cause the at least one processor to perform operations comprising: determining that a first user tagged at least two second users in association with a media content item created by the first user; and automatically adding, in response to the determining, a message to a group message thread between the first user and the at least two second users, wherein the message indicates that the at least two second users were tagged in association with the media content item.

In Example 20, the subject matter of Example 19 includes, the operations further comprising: receiving an indication of user input to publish the media content item as a Story associated with the first user, wherein automatically adding the message to the group message thread is further in response to receiving the indication.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system comprising:

at least one processor;

at least one memory component storing instructions that, when executed by the at least one processor, cause the at least one processor to perform operations comprising:

detecting that a first user tagged at least two second users and a third user in association with a media content item created by the first user;

determining that the at least two second users are bidirectional contacts of the first user of the first user, such that the first user added each of the least two second users as a contact, and each of the at least two second users added the first user as a contact;

automatically adding, based on determining that the at least two second users are bidirectional contacts of the first user, a first message to a group message thread between the first user and the at least two second users, wherein the first message indicates that the at least two second users were tagged in association with the media content item;

determining that the third user is a non-bidirectional contact of the first user, such that either the first user added the third user as a contact or the third user added the first user as a contact, but not both; and based on determining that the third user is a non-bidirectional contact of the first user, refraining from adding the third user to the group message thread, and adding a second message to an individual message thread between the first user and the third user, wherein the second message indicates that the third user was tagged in association with the media content item.

2. The system of claim 1, the operations further comprising:

receiving an indication of user input to publish the media content item as a Story associated with the first user, wherein automatically adding the first message to the group message thread is further in response to receiving the indication.

3. The system of claim 1, the operations further comprising:

causing, on a first device associated with the first user, display of an interface element for tagging the at least two second users and the third user in association with the media content item; and receiving an indication of user input provided by the first user via the interface element, the user input selecting the at least two second users and the third user for tagging in association with the media content item, wherein the detecting corresponds to receiving the indication.

4. The system of claim 3, wherein the user input selecting the at least two second users corresponds to user selection of a predefined group which includes the first user and the at least two second users.

5. The system of claim 1, the operations further comprising:

prompting the first user prior to adding the first message to the group message thread.

6. The system of claim 1, the operations further comprising:

detecting, prior to adding the first message to the group message thread, that the group message thread exists between the first user and the at least two second users, wherein adding the first message to the group message thread is performed based on the detecting.

7. The system of claim 1, the operations further comprising:

detecting, prior to adding the first message to the group message thread, that the group message thread does not exist between the first user and the at least two second users; and creating, based on detecting that the group message does not exist, the group message thread between the first user and the at least two second users, wherein adding the first message to the group message thread is performed based on the creating.

8. A method comprising:

detecting that a first user tagged at least two second users and a third user in association with a media content item created by the first user;

determining that the at least two second users are bidirectional contacts of the first user of the first user, such that the first user added each of the least two second users as a contact, and each of the at least two second users added the first user as a contact;

automatically adding, based on determining that the at least two second users are bidirectional contacts of the first user, a first message to a group message thread between the first user and the at least two second users, wherein the first message indicates that the at least two second users were tagged in association with the media content item;

determining that the third user is a non-bidirectional contact of the first user, such that either the first user added the third user as a contact or the third user added the first user as a contact, but not both; and based on determining that the third user is a non-bidirectional contact of the first user, refraining from adding the third user to the group message thread, and adding a second message to an individual message thread between the first user and the third user, wherein the second message indicates that the third user was tagged in association with the media content item.

9. The method of claim 8, further comprising:

receiving an indication of user input to publish the media content item as a Story associated with the first user, wherein automatically adding the first message to the group message thread is further in response to receiving the indication.

10. The method of claim 8, further comprising:

causing, on a first device associated with the first user, display of an interface element for tagging the at least two second users and the third user in association with the media content item; and receiving an indication of user input provided by the first user via the interface element, the user input selecting the at least two second users and the third user for tagging in association with the media content item, wherein the detecting corresponds to receiving the indication.

11. The method of claim 10, wherein the user input selecting the at least two second users corresponds to user selection of a predefined group which includes the first user and the at least two second users.

12. The method of claim 8, further comprising:

prompting the first user prior to adding the first message to the group message thread.

13. The method of claim 8, further comprising:

detecting, prior to adding the first message to the group message thread, that the group message thread exists between the first user and the at least two second users, wherein adding the first message to the group message thread is performed based on the detecting.

14. The method of claim 8, further comprising:

detecting, prior to adding the first message to the group message thread, that the group message thread does not exist between the first user and the at least two second users; and creating, based on detecting that the group message does not exist, the group message thread between the first user and the at least two second users, wherein adding the first message to the group message thread is performed based on the creating.

15. A non-transitory computer-readable storage medium storing instructions that, when executed by at least one processor, cause the at least one processor to perform operations comprising:

detecting that a first user tagged at least two second users and a third user in association with a media content item created by the first user;

determining that the at least two second users are bidirectional contacts of the first user of the first user, such that the first user added each of the least two second users as a contact, and each of the at least two second users added the first user as a contact;

automatically adding, based on determining that the at least two second users are bidirectional contacts of the first user, a first message to a group message thread between the first user and the at least two second users, wherein the first message indicates that the at least two second users were tagged in association with the media content item;

determining that the third user is a non-bidirectional contact of the first user, such that either the first user added the third user as a contact or the third user added the first user as a contact, but not both; and based on determining that the third user is a non-bidirectional contact of the first user, refraining from adding the third user to the group message thread, and adding a second message to an individual message thread between the first user and the third user, wherein the second message indicates that the third user was tagged in association with the media content item.

16. The non-transitory computer-readable storage medium of claim 15, the operations further comprising:

receiving an indication of user input to publish the media content item as a Story associated with the first user, wherein automatically adding the first message to the group message thread is further in response to receiving the indication.

17. The non-transitory computer-readable storage medium of claim 15, the operations further comprising:

causing, on a first device associated with the first user, display of an interface element for tagging the at least two second users and the third user in association with the media content item; and receiving an indication of user input provided by the first user via the interface element, the user input selecting the at least two second users and the third user for tagging in association with the media content item, wherein the detecting corresponds to receiving the indication.

18. The non-transitory computer-readable storage medium of claim 17, wherein the user input selecting the at least two second users corresponds to user selection of a predefined group which includes the first user and the at least two second users.

* * * * *